United States Patent

[11] 3,582,776

| [72] | Inventors | Andrew Alford<br>C/o Alford Manufacturing Co. 120 Cross St., Winchester;<br>Pasquale Barbagallo, Bedford, both of Mass. |
|---|---|---|
| [21] | Appl. No. | 769,168 |
| [22] | Filed | Oct. 21, 1968 |
| [45] | Patented | June 1, 1971 |
| [73] | Assignee | Alford by said Barbagallo |

[54] SLOTTED WAVEGUIDES
2 Claims, 5 Drawing Figs.

[52] U.S. Cl. .................................................... 324/95, 333/98
[51] Int. Cl. .................................................... G01r 21/00, H01p 1/00
[50] Field of Search ............................................ 324/95, 58, 58.5; 333/98, 35; 313/63; 33/60, 84, 88; 90/(Inquired)

[56] References Cited
UNITED STATES PATENTS

| 2,496,837 | 2/1950 | Woodyard | 324/95X |
| 2,516,169 | 7/1950 | Wong | 324/95X |
| 2,873,430 | 2/1959 | Tomijasu | 324/95X |

OTHER REFERENCES

Grand, P.; IEEE Transactions on Nuclear Science; v. NS-14; no. 3; June 1967; pages 860 through 866. copy in Sci. Lib.

Primary Examiner—Rudolph V. Rolinec
Assistant Examiner—Ernest F. Karlsen
Attorney—Wolf, Greenfield and Hieken ABSTRACT: A slotted waveguide for high microwave frequencies has its bottom shimmed at spaced points to straighten slight departures from straightness in the longitudinally extending hole.

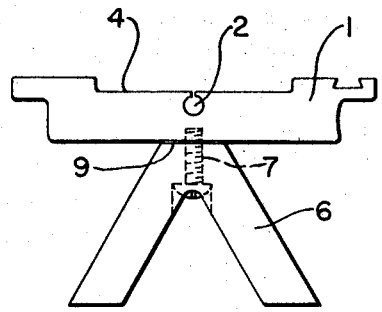
FIG. 2A
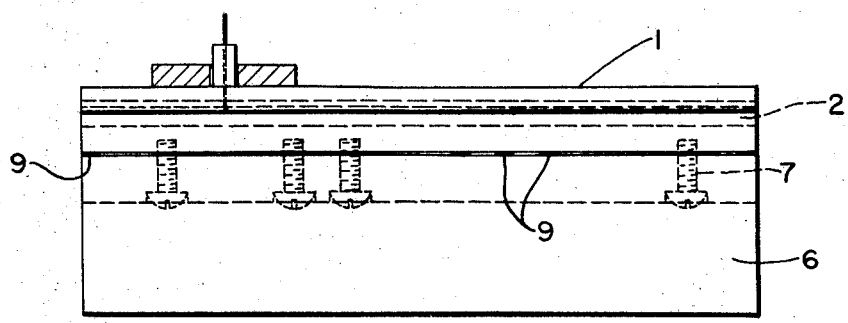
FIG. 2B
FIG. 2C
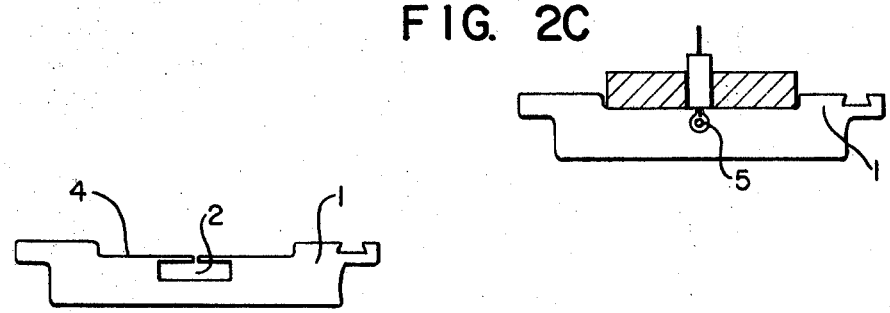
FIG. 2D

SLOTTED WAVEGUIDES

BACKGROUND OF THE INVENTION

The present invention relates in general to slotted measuring waveguides and methods of making them and more particularly concerns novel precision slotted measuring waveguides for use at high microwave frequencies and methods of making them.

A slotted waveguide is especially useful for making impedance measurements. A probe extends through the slot into the waveguide for detecting the intensity of the RF field at the tip of a probe supported by a carriage on calibrated ways. The distance between a maximum and adjacent minimum is an accurate measure of the wavelength of the RF energy inside the waveguide with the ratio of the maximum to the minimum being representative of the VSWR of the circuit to which the slotted line is coupled. For performing accurate measurements the VSWR of the slotted waveguide itself should be as near to unity as possible. At higher frequencies where the span of the waveguide cross section is physically small, it has been difficult to achieve the desired high accuracies.

Accordingly, it is an important object of this invention to provide high microwave frequency precision slotted measuring waveguides with exceptionally low VSWR.

It is another object of the invention to provide methods for making slotted waveguides in accordance with the preceding object.

It is a further object of the invention to achieve one or more of the preceding objects relatively inexpensively.

It is still another object of the invention to achieve one or more of the preceding objects while adding relatively little additional cost to the slotted waveguide.

SUMMARY OF THE INVENTION

According to the invention, means are provided for compensating for slight departures in straightness of the longitudinally extending hole in the slotted waveguide. Typically this means comprises a flat stiff support block to which the bottom of the waveguide is fastened with means, such as shims, between the support block and the waveguide bottom for maintaining straightness of the hole.

According to the method of the invention the waveguide block may be carefully machined by known techniques to form a nearly straight hole. The straightness of the hole is measured within microinches by placing the flat bottom of the waveguide upon a very flat plate, such as granite plate, and measuring the departure from straightness of the bottom of the waveguide cavity to determine a measured profile. From this measured profile an arrangement of holes may be prepared in the very stiff metal support block, preferably so that the low points of the measured profile are between holes. The surface of this support block is preferably milled flat and the bottom of the slotted waveguide screwed to the support block flat surface with thin shims inserted between the waveguide bottom and the support block of thickness and so positioned that measurements indicate the hole is almost perfectly straight.

Numerous other features, objects and advantages of the invention will become apparent from the following specification when read in connection with the accompanying drawing in which:

BRIEF DESCRIPTION OF THE DRAWING

FIG. 2A is an end view of the assembled structure of FIG. 1;

FIG. 2B is a side view of the assembled structure of FIG. 1;

FIG. 2C is an end view of the slotted waveguide illustrating the probe and slab; and FIG. 2D is a sectional view through a slotted rectangular waveguide that may embody the principles of the invention.

DETAILED DESCRIPTION OF PREFERRED EMBODIMENTS

Figure 1:
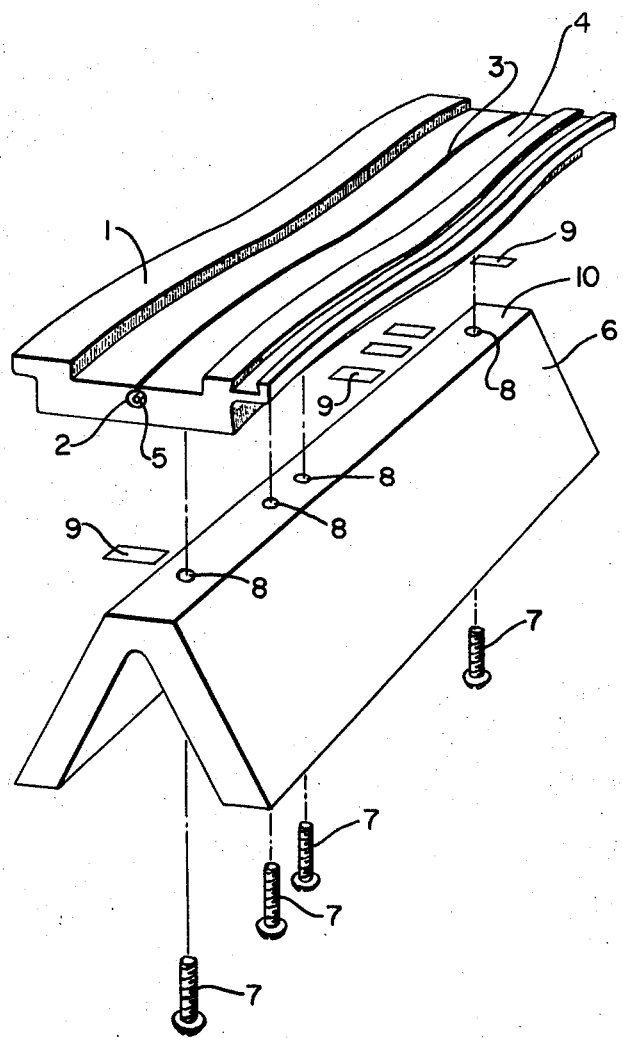
FIG. 1 is an exploded view of structure comprising a slotted waveguide according to the invention with the departure from straightness exaggerated to illustrate the problem solved by the invention.

With reference now to the drawing and more particularly FIG. 1 thereof, a slotted waveguide according to the invention may comprise a coaxial slotted line comprising a metal block 1 forming the outer conductor of inside diameter corresponding to that of the longitudinal hole 2 bored through metal block 1. A coaxial metal rod 5 forms the inner conductor and extends for the full length of the outer conductor. Inner conductor 5 may be supported by dielectric means (not shown) such as, for example, compensated dielectric pins described in Adams U.S. Pat. No. 2,796,589.

A narrow longitudinal uniform slot 3 in block 1 is arranged so that the plane passing through its center also passes through the centerline of longitudinal hole 2 and inner conductor 5 to allow a thin insulated probe 11 dielectrically supported from an oil-filled powdered metal slab 12 (FIG. 2C) riding on ways 4 to be used to measure the high frequency electric field between the inner conductor 5 and outer conductor defined by block 1 when a source of high frequency energy is connected across the inner and outer conductors at one end and a desired load being measured is connected at the opposite end.

Applying conventional manufacturing techniques used for lower frequencies resulted in slotted waveguides that did not have the desired low residual VSWR. It was discovered that the accuracy with which the field can be measured depends among other things on two important factors; namely, the straightness of the hole 2 in the outer conductor defined by block 1; and the flatness of ways 4 on which the slab 12 supporting the pin probe 11 is riding. The plane of the ways should be parallel to the axis of hole 2.

The degree of desired straightness on an absolute scale increases as the outer diameter of the coaxial line comprising the outer conductor defined by block 1 and the inner conductor 5 is decreased. For example, when the diameter of the outer conductor is but 3.5 mm., the desirable straightness as measured in the longitudinal plane bisecting the slot 3, a plane that is also usually perpendicular to ways 4, may well be of the order of but 100 microinches in a length of, for example, 8 inches. Such a degree of straightness is not readily achieved by conventional methods. It has been discovered, however, that the requirement for unusual straightness need be met only in one plane; namely, the plane at right angles to the ways. The degree of straightness in a plane parallel to the ways may be less stringent by a factor of the order of 10. It is this discovery that facilitates achieving a high degree of measuring accuracy with a relatively simple and economically feasible structure and a practical method of manufacture.

These results are accomplished by carefully machining block 1 by conventional means. After machining, the straightness of the hole is measured within microinches with the aid of a very flat plate, typically a granite plate, and appropriate known indicating devices to determine a measured profile of block 1. From this measured profile an arrangement of holes 8 in a very stiff metal block 6 is determined, preferably so that low points occur between adjacent ones of holes 8. The mating surface 10 of block 6 is preferably ground flat on a precision surface grinder, although milling may be acceptable.

Block 1 is then fastened to block 6 with screws such as 7. The straightness of hole 2 is again measured. Usually the hole is then still not straight. However, by inserting the very thin shims of metal, such as 9, typically a very thin metal foil, between blocks 1 and 6, the hole may be made straight to within a few microinches. Alternately, small amounts of material in either or both of blocks 1 and 6 could be removed below high spots. When making these adjustments to straighten hole 2, preferably accurately measure the distance between a ball end probe seated in hole 2 and a very flat plate, such as of granite, on which support block 6 is placed. The indicator may be supported between the upper end of the ball end probe and a depending element from a supporting structure that rides along the very flat plate to indicate slight deviations in the separation between the ball end probe and the depending element corresponding to deviations from straightness of the hole.

In some cases it may be desirable to have the probe carriage ride on straight rigid metal blocks which are rigidly connected to support block 6 or slotted waveguide block 1 instead of riding directly on ways 4. It is still desirable and important the hole or bore 2 be as straight as possible. The same is also true of small slotted waveguides, such as illustrated in FIG. 2D.

There has been described novel slotted waveguides and methods of their manufacture representing an unobvious solution to an unobvious problem resulting in highly accurate slotted waveguide measurements with relatively little additional cost. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What we claim is:

1. A slotted precision measuring waveguide comprising
a long, relatively flexible, metallic bar having a central longitudinal channel therein defining a waveguide,
a longitudinal slot in the surface of the metallic bar communicating with the longitudinal channel, a detecting probe means extending through the slot and moveable longitudinally along the waveguide for detecting energy in the channel,
a rigid supporting base having a longitudinal surface that is accurately flat,
longitudinally spaced means for fastening the metallic bar to the supporting base whereby the longitudinal waveguide channel is disposed in alignment with the longitudinal flat surface, and
shim means positioned between said fastening means and interposed between the bar and the base, the shim means being situated to compensate for departures in straightness of the longitudinal waveguide channel.

2. A method of making the slotted precision measuring waveguide of claim 1, which method comprises the steps of
boring the metallic bar to form the longitudinal channel therein,
forming the longitudinal slot in the surface of metallic bar,
placing the bar on the base and measuring the departure from straightness of the channel along its length to obtain a longitudinal profile,
forming holes in the base to cause the low points of the profile to be between the holes,
disposing shims between the bar and base at locations between the holes to correct for the departure from straightness, and
inserting fastening means through the holes to secure the bar to the base.